United States Patent
Reimus et al.

(10) Patent No.: US 7,668,259 B2
(45) Date of Patent: Feb. 23, 2010

(54) SIGNAL RECOGNITION FOR COMBINED RECEIVER FOR REMOTE KEYLESS ENTRY AND TIRE PRESSURE MONITORING SYSTEMS

(75) Inventors: David Reimus, Warren, MI (US); Tejas Desai, Troy, MI (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 587 days.

(21) Appl. No.: 11/453,208

(22) Filed: Jun. 14, 2006

(65) Prior Publication Data
US 2006/0279411 A1  Dec. 14, 2006

Related U.S. Application Data

(60) Provisional application No. 60/690,353, filed on Jun. 14, 2005.

(51) Int. Cl.
*H03K 9/00* (2006.01)
(52) U.S. Cl. .................... 375/316; 375/320; 375/323
(58) Field of Classification Search ............ 375/316, 375/320, 322, 323, 334
See application file for complete search history.

(56) References Cited

U.S. PATENT DOCUMENTS

| | | | | |
|---|---|---|---|---|
| 5,537,100 A | * | 7/1996 | Hallberg | ............. 340/825.21 |
| 5,561,693 A | * | 10/1996 | Yung et al. | ............. 375/377 |
| 5,724,389 A | * | 3/1998 | Marko et al. | ............. 375/225 |
| 5,790,946 A | * | 8/1998 | Rotzoll | ............. 455/343.1 |
| 5,844,517 A | * | 12/1998 | Lambropoulos | ............. 341/176 |
| 5,901,191 A | * | 5/1999 | Ohno | ............. 375/377 |
| 6,181,254 B1 | * | 1/2001 | Vogele | ............. 340/825.69 |
| 6,448,892 B1 | | 9/2002 | Delaporte | |
| 2003/0122660 A1 | | 7/2003 | Kachouh et al. | |
| 2004/0036589 A1 | | 2/2004 | Lin | |
| 2005/0063491 A1 | * | 3/2005 | Saloka | ............. 375/322 |
| 2005/0104715 A1 | | 5/2005 | Farrell | |
| 2005/0232376 A1 | * | 10/2005 | Liem et al. | ............. 375/322 |

FOREIGN PATENT DOCUMENTS

EP    1 187 346    3/2002

OTHER PUBLICATIONS

International Search Report dated Sep. 27, 2006.

\* cited by examiner

*Primary Examiner*—Emmanuel Bayard

(57) ABSTRACT

A receiver is utilized to receive signals from various systems within a vehicle such as tire pressure monitoring system (TPM) and a remote keyless entry system (RKE). During the on time, the receiver sequentially is open to receive a first signal with a first baud rate. If the signal of the first baud rate is not received, the receiver receives a second signal at a second baud rate. Upon receipt of a transmission, the receiver operates according to a mode that corresponds to the transmission indicated by the specific baud rate. The operation of the receiver can include specialized filtering, or other known signal processing that is tailored to the specific transmission data communication requirements.

16 Claims, 2 Drawing Sheets

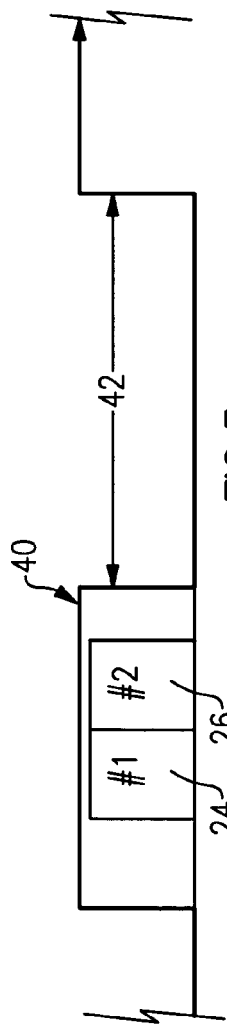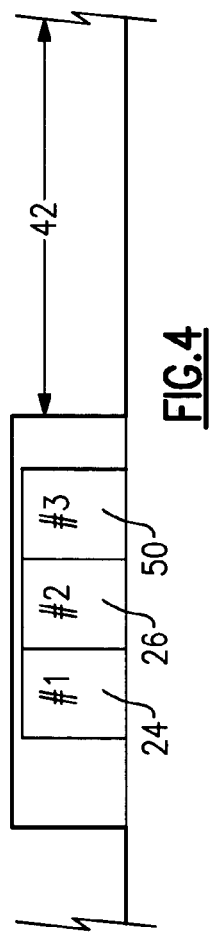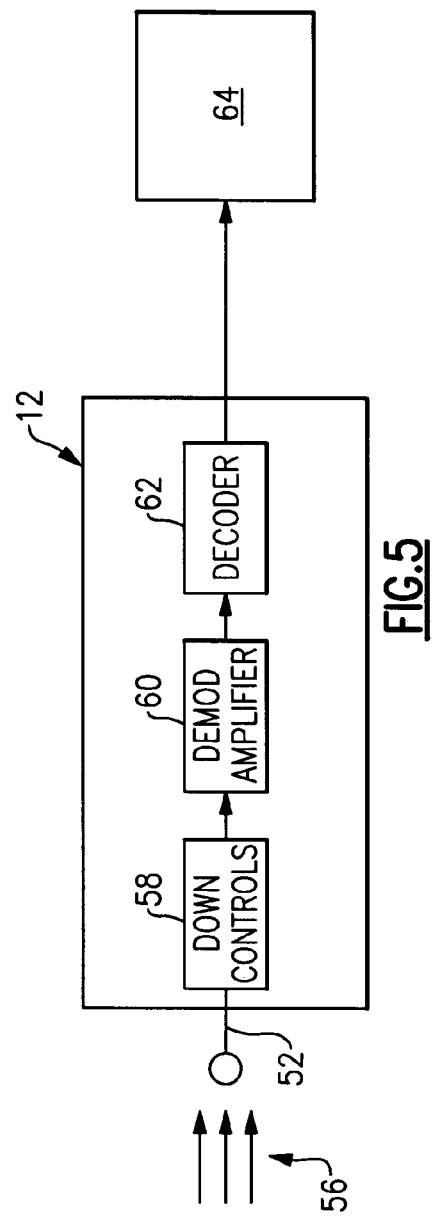

SIGNAL RECOGNITION FOR COMBINED RECEIVER FOR REMOTE KEYLESS ENTRY AND TIRE PRESSURE MONITORING SYSTEMS

CROSS REFERENCE TO RELATED APPLICATION

The application claims priority to U.S. Provisional Application No. 60/690,353 which was filed on Jun. 14, 2005.

BACKGROUND OF THE INVENTION

This invention generally relates to receiver and method of operating a receiver. More particularly, this invention relates to a receiver and method of operating a receiver to identify and tailor operation to an incoming signal.

Automobiles and other vehicles now include various wireless transmission devices for communicating various different commands and information. Each system includes a unique frequency modulation, transmission rate and other characteristics that provide desired performance for that particular system. Accordingly, a receiver for one system can be tailored to filter surrounding noise and other transmissions in favor of the sole desired signal. For example, a remote keyless entry system operates at a specific frequency modulation and transmission rate that optimizes the distance from the vehicle that the signal is received. Further, that particular signal can be isolated from other signals from other vehicles. Another system receives signals from tire pressure sensors indicative of tire conditions. Such systems can be optimized to conserve battery power within the remotely mounted tires. As appreciated, a receiver for each system could be tailored to perform optimally for the specific characteristics of each system.

However, separate receivers for each system are not economically practical. Therefore, one receiver is programmed to receive signals from multiple systems, such as the remote keyless entry system and the tire pressure monitoring system, for example. For this reason, the receiver is not tailored to receive one signal, but is instead programmed to receive various differing signals. Because the receiver receives more than one form of transmission, it must recognize the incoming signal and determine what type of signal is being received. The method of determining the type of incoming signal to the receiver needs to be timely, accurate and capable of discerning between noise, and signals associated with other vehicles.

Accordingly, it is desirable to design and develop a receiver and method of operating a receiver that provides for the recognition of incoming signals and tailoring of receiver operation based on the format of the received signal.

SUMMARY OF THE INVENTION

An example receiver and method of operating a receiver includes the receipt of a wake up portion of a transmission, identification of a unique baud rate for that transmission and tailoring of receiver operation to the characteristics of the transmission indicated by the unique baud rate.

An example receiver is utilized to receive signals from various systems within a vehicle such as tire pressure monitoring system (TPM) and a remote keyless entry system (RKE). The receiver operates by cycling between a dormant off condition where no signals are received and an "on" condition were the receiver is open to receipt of a transmission. The dormant and on conditions are separated by the interval that is determined such that the on times of the receiver coincide with at least a portion of a wake up portion of a transmission.

During the on time, the receiver sequentially is open to receive a first signal with a first baud rate. The first example signal is related to a baud rate of 2.4 Kbits/second and corresponds to the RKE system. If the 2.4 Kbits/second is not received by the receiver, the receiver switches to looking for the second example signal at a baud rate of 9.6 Kbits/s. Of course other transmission rates could also be utilized to provide the desired indication of transmission type.

Once one of the transmissions is received, the receiver will switch to an operation that corresponds to the transmission indicated by the specific baud rate. The operation of the receiver can include specialized filtering, or other known signal processing that is tailored to the specific transmission data communication requirements.

Once the receiver has acted on the received transmission and returned to cyclical dormant and on conditions, the sequence and priority of signals received is reinstated. The priority of signals can be determined according to vehicle operating conditions, or simply cycled iteratively between the types of transmissions that the receiver is designed to receive.

Accordingly, the example method and receiver tailors operation responsive to the recognition of incoming signals by a unique transmission rate for each received signal.

These and other features of the present invention can be best understood from the following specification and drawings, the following of which is a brief description.

BRIEF DESCRIPTION OF THE DRAWINGS

FIG. 3 is a schematic illustration of example signals received during an example on cycle of a receiver according to this invention.

FIG. 4, is another schematic illustration of example signals received during an example on cycle of a receiver according to this invention.

FIG. 5 is a schematic illustration of an example receiver according to this invention.

DETAILED DESCRIPTION OF THE PREFERRED EMBODIMENT

Figure 1:
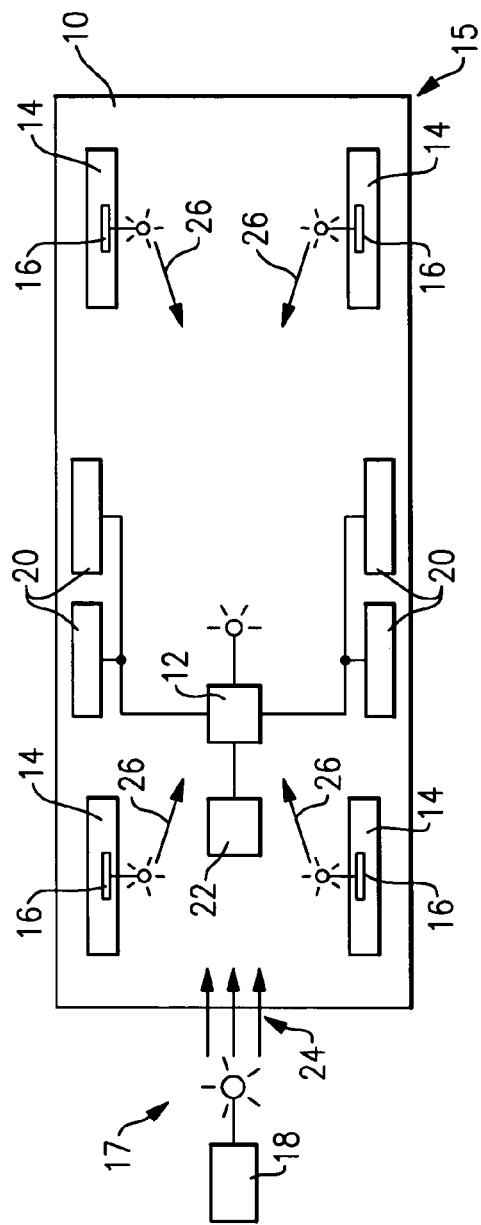
FIG. 1 is a schematic view of an example receiver within a vehicle for receiving signals from a tire pressure monitoring system and a remote keyless entry system.

Referring to FIG. 1, an example receiver 12 is utilized to receive signals from various systems within a vehicle 10. The example vehicle 10 includes a tire pressure monitoring system (TPM) 15 and a remote keyless entry system (RKE) 17. The RKE system 17 includes a transmitter 18, such as for example a key fob that sends a first signal 24 to the receiver 12. The TPM system 15 forwards a second signal 26 from a sensor 16 within each of the tires 14. The first signal 24 transmits information and commands utilized to gain access to the vehicle 10, by operating features such as door locks on doors 20. The second signal 26 transmits information indicative of tire conditions from each of the sensors 16. This information is then forwarded to a display device 22 to provide operator information indicative of tire conditions.

As appreciated, the RKE 17 and TPM 15 systems are examples of wireless systems that send signals to a common receiver 12. Other systems installed or associated with the vehicle may also communicate with the receiver 12, in addition to the RKE 17 and TPM 15 systems.

The receiver 12 is operated to conserve battery power by cycling between an off and on condition. The receiver 12 will periodically turn "on" and search for transmissions from one of the various systems. The "on" time is determined at intervals 42. The intervals 42 are determined to correspond with a wake up portion 32 of each of the signals that the receiver 12 is to receive. The duration of the wake up portion 32 in this example is greater than the interval 42 such that a transmission will not consistently miss the receiver cycle "on" time 40. Accordingly, the receiver 12, cycles to an "on" condition as indicated by the duration 40 and looks for one of the first and second signals 24, 26. If one of the first and second signals 24, 26 is present, the receiver 12 will wake up and prepare for receiving the data that is preceded by the signals wake up portion 32.

Each of the first and second signals 26, 24 includes an amplitude shift keyed (ASK) wake up portion 32. The wake up portion includes information that indicates the transmission rate for that particular signal. Different transmissions from different systems perform best when transmitted at a preferred transmission rate. In the disclosed example, the TPM system 17 transmits at a baud rate of 9.6 Kbits/second, and the RKE system 15 transmits at a baud rate of 2.4 Kbits/second. As appreciated, in this disclosure the terms transmission rate and baud rate are utilized interchangeably to relate data transmission speed. The receiver 12 recognizes the baud rate and adjusts filtering components to receive the corresponding signal. In this way, the receiver 12 is tailored to provide the desired filtering that corresponds to the specific signal to improve signal processing.

Referring to FIG. 3, the receiver cycle "on" portion 40 is shown and illustrates operation and reception. The receiver 12 cycles "on" as indicated by the "on" portion 40 and searches sequentially for the first signal 24 of a first baud rate, and a second signal 26 at a second baud rate. If the receiver 12 turns "on" and detects the first signal 24, the receiver 12 will configure itself according to receive and filter the data portion 34 of the first signal in as desired manner determined according the specific characteristics of that signal.

Only if the first signal 24 is not found or received, does the receiver sequence to looking for the second signal 26. Upon receipt of the second signal 26, the receiver 12 is switched to operation determined and tailored to receipt of the second signal 26. The first and second signals 24, 26 each include the wake up portion 32 that is of a common modulation. In the example, the wake up portion 32 for each signal to be received by the receiver is an ASK modulated signal. The cycle "on" portion 40, therefore looks for an ASK signal with a specified baud rate upon cycling on. If that signal is received, the receiver 12 switches to a mode tailored to receive that signal. The mode can include switching from ASK modulation to frequency shift keyed modulation (FSK). Additionally, although ASK and FSK modulation are discussed by example, it is within the contemplation of this invention that other known modulations could be utilized for the wake up portion and also for the data portions of any transmission. Further, the receiver 12 can be programmed to engage certain desirable filtering protocols corresponding to the receives signal. Other operational parameters of the receiver 12 can be engaged responsive to the determination of a specified baud rate.

The sequence in which the receiver 12 looks for transmission of a specified baud rate is determined according to desired performance and operational priorities. In the disclosed example several conditions can be utilized to determine the sequence in which the receiver will look for and orientate itself to receive a transmission. The object and use of the transmission can be used to determine this sequence. For example, if the vehicle is parked, preference would be given to first receiving transmissions from the RKE system 17. Thereby, giving priority to a user attempting to unlock and enter the vehicle. Further, if the vehicle 10 is in motion, preference can be given to the TPM system 15, as transmissions indicative of tire conditions are more likely than transmissions for opening or unlocking the vehicle doors 20.

Further, priority can be cycled back and forth between desired transmissions such that each separate transmission will be received and acknowledged by the receiver 12 according to a desired sequential priority.

Referring to FIG. 4, a third transmission 50 is included in the sequential priority. The third transmission 50 includes a transmission rate that is different than the transmission rates for the first and second signals 24, 26. The number of different transmissions in which the receiver 12 can receive and switch to can include additional transmissions to facilitate use of the receiver 12 with additional systems.

Referring to FIG. 5, an example schematic of the receiver 12 is shown and includes an antenna 52 for receiving a signal 56. The received signal 56 is routed to a down converter 58. The down converter 58 operates as is known to remove any carrier or extraneous frequencies. The filtered signal is then forwarded to a demodulator adaptor 60 where the transmission rate is recognized and the orientation of the adaptive filtering is determined. This step may also include amplifying the signal to level desired to provide desired signals. The signal is then forwarded to a decoder 62 where the signal is read and converted to codes specific to commands or information that is utilized by a system 64. The decoder 62 utilizes the information relating to baud rate for the signal to switch to a desired filtering to eliminate signal interferences and noise for the specific signal.

As appreciated, the functions described with reference to the specific features of the receiver 12 can be performed by one or several microcontrollers programmed to perform the desired signal conditioning in response to the detected baud rate. Further, a worker skilled in the art would understand how to program the microcontroller to tailor operation of the receiver 12 for a specific transmission.

Figure 2:
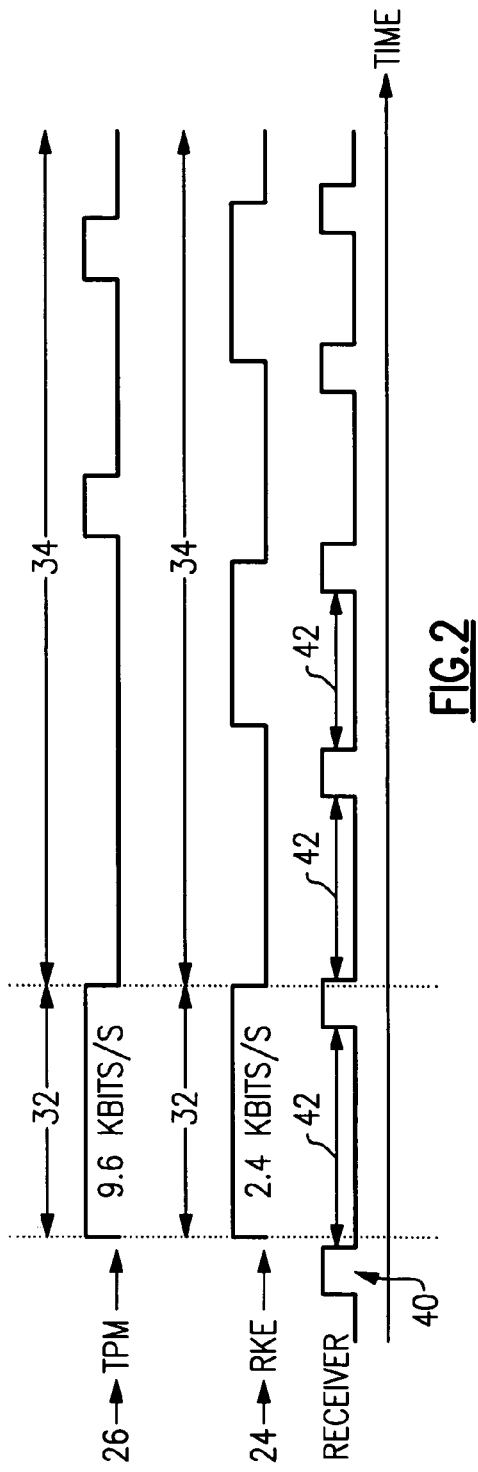
FIG. 2 is a schematic illustration of example signals to the receiver from the tire pressure monitoring system and the remote keyless entry system.

Referring to FIGS. 2 and 3, the receiver 12 operates by cycling between a dormant "off" condition where no signals are received and an "on" condition were the receiver is open to receipt of a transmission. The dormant and "on" conditions are separated by the interval 42 that is determined such that the "on" times of the receiver 12 coincide with at least a portion of a wake up portion 32 of a transmission. During the "on" time, the receiver 12 sequentially is open to receive a first signal 24 with a first baud rate. The first example signal 24 is related to a baud rate of 2.4 Kbits/second and corresponds to the RKE system 15. If the 2.4 Kbits/second is not received by the receiver, the receiver switches to looking for the second example signal at a baud rate of 9.6 Kbits/s that corresponds with a signal from the TPM system 15. Once one of the transmissions is received, the receiver 12 will switch to an operation that corresponds to the transmission indicated by the specific baud rate. The operation of the receiver include specialized filtering, or other known signal processing that is tailored to the specific transmission data communication requirements.

Once the receiver 12 has acted on the received transmission and returned to cyclical dormant and "on" conditions, the sequence and priority of signals received is reinstated. The priority of signals can be determined according to vehicle operating conditions, or simply cycled iteratively between the types of transmissions that the receiver 12 is designed to receive.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of operating a receiver comprising the steps of:
   a) receiving a first amplitude shift keyed wake up portion as part of a first signal that initiates operation of the receiver;
   b) receiving a second amplitude shift keyed wake up portion as part of a second signal, wherein a baud rate of the first amplitude shift keyed wake up portion is different than a baud rate of the second amplitude shift keyed wake up portion;
   c) determining a baud rate of the first signal and the second signal based on the baud rate of the first and second amplitude shift keyed wake up portion; and
   d) switching operation of the receiver for receiving one of an amplitude shift keyed signal and a frequency shift keyed signal responsive to the determined baud rate of one of the first and second amplitude shift keyed wake up portions received signal.

2. The method as recited in claim 1, wherein said step d comprises tailoring operation of the receiver according to a desired preference between the first signal and the second signal.

3. The method as recited in claim 1, wherein the receiver is operated to receive one of the first and second signals at desired intervals.

4. The method as recited in claim 3, wherein each of the first and second amplitude shift keyed wake up portions is transmitted for a time greater than the desired intervals.

5. The method as recited in claim 1, wherein a remainder of the first and second signals are modulated differently.

6. The method as recited in claim 1, wherein the receiver sequentially seeks a signal of a first baud rate and then a signal having a second baud rate.

7. The method as recited in claim 1, wherein the first baud rate comprises 2.4 Kbits/second and the second baud rate comprises 9.6 Kbits/second.

8. A method of tailoring operation of a receiver for receiving transmissions from a vehicle system comprising the steps of:
   a) receiving a first transmission having a first wake up portion and a first transmission rate;
   b) receiving a second transmission having a second wake up portion and a second transmission rate, wherein the first wake up portion and the second wake up portion comprises a common frequency modulation and a remainder of the first transmission includes a modulation different than a remainder of the second transmission;
   c) identifying the transmission based on a transmission rate of the wake up portion; and
   d) switching the receiver to a mode of operation corresponding with the transmission responsive to identifying the transmission based on the transmission rate of the wake up portion.

9. The method as recited in claim 8, comprising receiving a first transmission prior to a second transmission according to a desired sequential order.

10. The method as recited in claim 9, wherein the first transmission comprise a first transmission rate, and the second transmission comprises a second transmission rate different than the first transmission rate.

11. The method as recited in claim 9, including receiving the second transmission responsive the absence of the first transmission.

12. The method as recited in claim 8, wherein step d includes filtering the transmission according to the identity of the transmission based on the wake up portion of the transmission.

13. The method as recited in claim 8, wherein the wake up portion comprises an amplitude shift keyed modulation.

14. A receiver for receiving signals from both a remote keyless entry system and a tire pressure monitoring system comprising:
   a controller for determining a transmission rate of an incoming amplitude shift keyed wake up signal; and
   a filter switched between a first mode for receiving frequency shift keyed signals and a second mode for receiving an amplitude shift keyed signal responsive to the determined transmission rate for processing the incoming signal according to the transmission rate corresponding to the determined incoming amplitude shift keyed wake up signal.

15. The receiver as recited in claim 14, wherein the controller operates to receive a first incoming signal including a first transmission rate preferentially over a second incoming signal including a second transmission rate.

16. The receiver as recited in claim 15, wherein the controller receives the second incoming signal in the absence of the first signal and the filter is switched to a mode of operation for processing the second signal responsive to the determined transmission rate.

* * * * *

UNITED STATES PATENT AND TRADEMARK OFFICE
CERTIFICATE OF CORRECTION

PATENT NO. : 7,668,259 B2 Page 1 of 1
APPLICATION NO. : 11/453208
DATED : February 23, 2010
INVENTOR(S) : Reimus et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this

Fourth Day of January, 2011

David J. Kappos
*Director of the United States Patent and Trademark Office*